(12) United States Patent
Hirt et al.

(10) Patent No.: US 10,881,120 B2
(45) Date of Patent: Jan. 5, 2021

(54) STARCH-BASED CLOUDING AGENT FOR POWDERED BEVERAGES

(71) Applicant: Kraft Foods Group Brands LLC, Chicago, IL (US)

(72) Inventors: Stacey Ann Hirt, Chicago, IL (US); Andrew E. McPherson, Mt. Prospect, IL (US); John B. Topinka, Evanston, IL (US); Maria Del Pilar Cobos, Port Chester, NY (US)

(73) Assignee: Kraft Foods Group Brands LLC, Chicago, IL (US)

( * ) Notice: Subject to any disclaimer, the term of this patent is extended or adjusted under 35 U.S.C. 154(b) by 238 days.

(21) Appl. No.: 15/265,656

(22) Filed: Sep. 14, 2016

(65) Prior Publication Data

US 2017/0000165 A1 Jan. 5, 2017

Related U.S. Application Data

(62) Division of application No. 14/579,005, filed on Dec. 22, 2014.

(51) Int. Cl.
*A23L 2/62* (2006.01)
*A23L 2/39* (2006.01)

(52) U.S. Cl.
CPC ................... *A23L 2/62* (2013.01); *A23L 2/39* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,187,326 A | 2/1980 | Serafino | |
| 4,279,940 A | 7/1981 | Wurzburg | |
| 4,596,602 A | 6/1986 | Bennett | |
| 4,873,112 A | 10/1989 | Mitchell | |
| 4,971,828 A | 11/1990 | Abbas | |
| 5,089,171 A | 2/1992 | Chiu | |
| 5,114,723 A | 5/1992 | Stray-Gundersen | |
| 5,194,284 A | 3/1993 | Chiu | |
| 5,424,088 A * | 6/1995 | Christianson | A21D 2/183 426/573 |
| 5,547,513 A * | 8/1996 | Mallee | A23C 9/1504 127/38 |
| 5,571,334 A * | 11/1996 | Dunn | A23C 11/08 127/29 |
| 5,597,608 A | 1/1997 | Fuisz | |
| 5,612,202 A | 3/1997 | Brumm | |
| 5,641,531 A | 6/1997 | Liebrecht | |
| 5,676,994 A * | 10/1997 | Eskins | A21D 2/16 426/602 |
| 5,759,581 A * | 6/1998 | Baensch | A23C 9/137 127/32 |
| 5,853,785 A * | 12/1998 | Nayyar | A23F 5/40 426/521 |
| 5,882,707 A | 3/1999 | Grillo | |
| 6,048,566 A | 4/2000 | Behnam | |
| 6,069,131 A | 5/2000 | Marsh | |
| 6,090,594 A * | 7/2000 | Kettlitz | C08B 30/12 426/661 |
| 6,159,522 A | 12/2000 | Chuang | |
| 6,509,045 B2 | 1/2003 | Henry | |
| 6,805,896 B2 | 10/2004 | Schmedding | |
| 7,094,434 B2 | 8/2006 | Gaonkar | |
| 7,781,003 B2 | 8/2010 | Bailey | |
| 7,815,960 B2 | 10/2010 | Quan | |
| 7,833,356 B2 * | 11/2010 | Woortman | A23C 9/1544 106/206.1 |
| 2002/0189607 A1 | 12/2002 | Lavoie | |
| 2005/0069992 A1 * | 3/2005 | Nickel | A23C 15/12 435/101 |
| 2005/0100649 A1 * | 5/2005 | Gaonkar | A23L 2/39 426/590 |
| 2006/0225731 A1 * | 10/2006 | Woortman | A23C 9/1544 127/32 |
| 2006/0286260 A1 | 12/2006 | Nayak | |
| 2012/0114826 A1 * | 5/2012 | Ambeskar | A23L 2/38 426/590 |

FOREIGN PATENT DOCUMENTS

| | | | |
|---|---|---|---|
| EP | 0029473 A1 | 6/1981 | |
| EP | 0553368 A1 * | 8/1993 | A23L 2/62 |

(Continued)

OTHER PUBLICATIONS

Siegel: EP2446751; published May 2, 2012 (Year: 2012).*
IP Australia; Examination Report No. 1 dated Feb. 7, 2019, Australian Application No. 2015369972 (5 pgs.).
IP Australia; Examination Report No. 2 dated Jun. 13, 2019, Australian Application No. 2015369972 (4 pgs.).
NZIPO; First Examination Report dated May 9, 2019, New Zealand Application No. 732537 (6 pgs.).
NZIPO; Further Examination Report dated Sep. 10, 2019; New Zealand Application No. 732537 (4 pgs.).
International Search Report, dated Aug. 9, 2016, for International Application No. PCT/US2015/065753 (6 pgs.).
Written Opinion of the International Searching Authority, dated Aug. 9, 2016, for International Application No. PCT/US2015/065753 (10 pgs.).

*Primary Examiner* — Patricia A George
(74) *Attorney, Agent, or Firm* — Fitch, Even, Tabin & Flannery LLP

(57) ABSTRACT

Disclosed are starch-based powdered clouding agents for dry beverage mixes and beverage mixes including such powdered clouding agents. The starch-based powdered clouding agent may consist essentially of retrograded maltodextrin and is substantially free of titanium dioxide. Methods of preparing beverage mixes including such powdered clouding agents are disclosed. The powdered clouding agents may be added to water to form a cloudy solution or to a dry beverage mix that may form a beverage having an opacity substantially the same as a comparable natural beverage when reconstituted with water.

11 Claims, No Drawings

(56) References Cited

FOREIGN PATENT DOCUMENTS

| | | |
|---|---|---|
| EP | 0553368 A1 | 8/1993 |
| EP | 1269865 A1 | 1/2003 |
| WO | 2013140382 | 9/2013 |

* cited by examiner

STARCH-BASED CLOUDING AGENT FOR POWDERED BEVERAGES

CROSS REFERENCE TO RELATED APPLICATIONS

This application is a divisional of U.S. application Ser. No. 14/579,005, filed Dec. 22, 2014, which is hereby incorporated herein by reference in their entirety.

FIELD

The field relates to clouding agents, and more specifically, to starch-based clouding agents for dry powdered beverages and methods for producing the same.

BACKGROUND

Dry beverage compositions, such as fruit juice beverage mixes, are typically formulated to closely imitate the mouthfeel, opacity, color, and flavor characteristic of the natural juice when the dry mix is reconstituted in water. A clouding agent is commonly used in the dry powdered beverage compositions to give the desired opacity similar to that of natural juice, when reconstituted, while providing a beverage mix which offers natural mouthfeel.

It is known to prepare clouding agents by combining titanium dioxide with a suspending agent such as gum and a spacing agent such as maltodextrin. For example, U.S. Pat. No. 4,187,326 discloses a clouding agent for dry mix beverages containing xanthan gum, maltodextrin, and titanium dioxide. Titanium dioxide ($TiO_2$) is considered in U.S. Pat. No. 4,187,326 to be the critical ingredient for providing opacity of the clouding agent.

Titanium dioxide is a white pigment that is commonly used in foods and beverages as a colorant or clouding agent. Although titanium dioxide has been listed as safe for consumption by the U.S. Food and Drug Administration for a long time, consumers often prefer ingredients that are perceived to be more "natural" over ingredients that are perceived by them to be "less natural." Clouding agents based on titanium dioxide may be perceived to be "less natural" in some cases.

In the method for preparing a clouding agent as described in U.S. Pat. No. 4,187,326, the gum and maltodextrin are first added to water and subjected to high shear mixing, the titanium dioxide is then added after the gum and maltodextrin are dispersed by the initial high shear mixing, and the mixture is again subjected to further high shear mixing. The resulting slurry is then dried, typically by spray drying. The resulting dried clouding agent may then be included in a dry beverage mix, particularly a fruit flavored dry beverage mix. In such prior methods and compositions, however, the titanium dioxide is considered essential to the functionality of the clouding agent and such methods and compositions would not be expected to function as intended without the titanium dioxide.

SUMMARY

Disclosed are powdered starch-based clouding agents comprising or in some cases consisting essentially of retrograded maltodextrin and substantially free of titanium dioxide, powdered beverage mixes including such starch-based clouding agents, and methods of preparation of such starch-based clouding agents and beverage mixes.

In one form, a powdered beverage mix includes a starch-based clouding agent and comprises one or more powdered beverage ingredients and a powdered starch-based clouding agent comprising or in some cases consisting essentially of retrograded amylose containing maltodextrin having a dextrose equivalent (DE) of about 1 to about 15 and substantially free of titanium dioxide.

The retrograded amylose containing maltodextrin may have an average particle size of about 0.1 microns to about 50 microns and may include no intact starch granules.

In one approach, the retrograded amylose containing maltodextrin is formed by retrogradation of an amylose containing maltodextrin present in water in an amount of about 10 to about 40% by weight for at least about 24 hours.

The retrograded amylose containing maltodextrin may have a dextrose equivalent of between about 4 and about 11.

By one approach, the powdered beverage mix further includes about 0.1 to about 4.0% of the retrograded amylose containing maltodextrin.

The retrograded dent corn maltodextrin may include from about 15% to about 26% amylose and from about 85% to about 74% amylopectin.

In one form, a powdered beverage mix including a starch-based clouding agent and comprises one or more powdered beverage ingredients and a powdered starch-based clouding agent comprising or in some cases consisting essentially of retrograded waxy maltodextrin having a dextrose equivalent (DE) of about 1 to about 4 and substantially free of titanium dioxide.

The retrograded waxy maltodextrin may have an average particle size of about 0.1 microns to about 50 microns and may include no intact starch granules.

In one approach, the retrograded waxy maltodextrin is formed by retrogradation of waxy maltodextrin present in water in an amount of about 20 to about 40% by weight for at least about 24 hours.

The retrograded waxy maltodextrin may have a dextrose equivalent of between about 1 and about 3.

In one approach, the powdered beverage mix includes about 0.1 to about 4% of the retrograded waxy maltodextrin.

The retrograded waxy maltodextrin may include up to about 1% amylose and from about 99% to about 100% amylopectin.

In one approach, a method of preparing a powdered starch-based clouding agent for a dry beverage mix composition includes: adding about 10% by weight to about 40% by weight maltodextrin to water to form a first maltodextrin solution where the maltodextrin is dissolved in the water; heating the first maltodextrin solution at a temperature from about 125° F. to about 175° F. to form a heated first solution; storing the heated first solution for at least about 12 hours to provide a second solution; and drying the second solution to form the powdered clouding agent.

In one approach, the method further includes adding an amylose containing maltodextrin having a dextrose equivalent of between about 1and about 15 to the water in an amount of about 25% by weight to about 35% by weight.

The adding of the amylose containing maltodextrin to water may include adding a waxy maltodextrin having a dextrose equivalent of between about 1 and about 4 to the water in an amount of about 25% by weight to about 35% by weight.

The heating of the first solution may further include stirring the first solution during the heating.

In one approach, the starch-based powdered clouding agent consists essentially of retrograded amylose containing corn maltodextrin and is substantially free of titanium dioxide and gum.

In another approach, the powdered starch-based clouding agent consists essentially of retrograded waxy maltodextrin and is substantially free of titanium dioxide.

In one approach, the heated first solution may be stored at a temperature of about 35° F. to about 45° F.

In another approach, the first solution may be stored at a temperature of about 65° F. to about 75° F.

The second solution may be spray-dried at a temperature of about 155° F. to about 175° F.

The method may include adding the starch-based powdered clouding agent to water in an amount of from about 0.005% to about 0.1% by total weight to provide an opaque aqueous solution.

The method may include adding the starch-based powdered clouding agent to a dry beverage mix composition in an amount of about 0.1% to about 4% by total weight of the dry beverage mix composition.

In one form, the method may include adding the dry beverage mix composition to water in an amount of about 0.005% to about 0.10% by total weight to form an opaque drinkable beverage.

DETAILED DESCRIPTION

The products and methods disclosed herein relate to powdered beverage mix compositions that form drinkable beverages when reconstituted with water having an opacity consistent to its natural, liquid beverage counterpart when the powdered beverage mix includes substantially no titanium dioxide. The powdered beverage mixes may include one or more powdered beverage ingredients and a powdered, starch-based clouding agent comprising or in some cases consisting essentially of retrograded maltodextrin and substantially free of titanium dioxide.

In one approach, the retrograded maltodextrin in the starch-based clouding agent is retrograded amylose-containing maltodextrin having a dextrose equivalent (DE) of about 1 to about 15. In another approach, the retrograded maltodextrin in the starch-based clouding agent is retrograded dent corn maltodextrin having a dextrose equivalent (DE) of about 1 to about 10. In another approach, the retrograded maltodextrin in the starch-based clouding agent is retrograded waxy corn maltodextrin having a dextrose equivalent (DE) of about 1 to about 5. Starch-based clouding agents outside of these DE ranges and starch types do not provide sufficient opacity to the final beverage when the powdered beverage mix is reconstituted with a liquid and when substantially no titanium dioxide is used.

As discussed above, it is known to use titanium dioxide as a clouding agent for powdered beverage mixes to provide a desired opacity of the drinkable beverage after reconstitution with water. In the conventional clouding agents that include titanium dioxide in combination with other ingredients, such as xanthan gum and a maltodextrin spacing agent, the titanium dioxide is considered to be the key substance responsible for the resulting opacity of the reconstituted beverage. The present inventors surprisingly discovered that a modified maltodextrin, more specifically, certain retrograded maltodextrins as described herein, advantageously provides a clouding agent substantially free of titanium dioxide and that may be added to a powdered beverage mix to enable the beverage mix, when reconstituted with liquids, to provide the desired opacity imitating the opacity of a similar natural juice.

Maltodextrins are hydrolyzed starch units of a-D-glucose bound together, mainly, by glycosidic (1→4) linkages. As hydrolyzed products of starch, maltodextrins may consist of a mixture of saccharides, mainly D-glucose, maltose and a series of oligosaccharides and polysaccharides. Commercially, maltodextrins are typically produced from native starch through partial hydrolysis, purification, and spray-drying. Such physical and enzymatic treatments typically lead to the loss of the granular structure of native starch. Unlike the natural starches, commercially available maltodextrins are generally soluble in water and are typically used in the food industry as texture modifiers, gelling agents, fat replacers, volume enhancers, and an encapsulation matrix to extend the shelf life of a product; however, such prior uses did not use the starch in a form or in an amount in powdered beverage mixes to be an effective clouding or opacifying agent.

Maltodextrins are usually classified by their values of dextrose equivalency, ranging up to 20. Dextrose equivalency (DE) expresses the number of reducing end aldehyde groups relative to pure glucose at the same concentration, so that high DE maltodextrin indicates high hydrolytic conversion and lower average molecular mass. Typically, the lower the DE value of a maltodextrin, the longer the chain length of the maltodextrin, and the higher the DE value of a maltodextrin, the shorter the chain length of the maltodextrin. As will be discussed in more detail below, it was discovered that differences in chain lengths (as reflected in DE values) may account for differences in the opacity of the reconstituted beverages including retrograded maltodextrins having different DE values. It was also discovered that chain lengths of the retrograded starch needed to provide desired opacity unexpectedly varied based on the type of starch used as the clouding agent so that selection of starch type and DE value was critical in achieving desired opacity. As will also be discussed in more detail below, the source of the starch (e.g., corn, manioc, rice or potato) also affects the molecular segments distribution of maltodextrin and may also account (without wishing to be bound by any theory) for differences in the opacity of the reconstituted beverages provided by retrograded maltodextrins having different DE values.

The ratio between the molecules of linear amylose chain and the branched-chain of amylopectin varies according to the type and nature of the starch. Normal starches contain between about 15% and about 35% amylose and about 65% to about 85% amylopectin. Dent corn starches may contain about 20% to about 30% amylose (in some cases, about 26% amylose) and about 70% to about 80% amylopectin (in some cases, about 74% amylopectin). Waxy corn starches may contain about 0% to about 1% amylose (in some cases, no amylose) and about 99% to about 100% amylopectin (in some cases, 100% amylopectin). The variations in the relative amounts of amylose and amylopectin between the dent corn starches and the waxy corn starches may account for visibly observable differences in the opacity of beverages reconstituted from beverage mixes including retrograded dent corn and waxy corn maltodextrins.

As described above, maltodextrins are typically made by hydrolysis of native starch, such as corn starch, potato starch, or the like. Native corn starch is formed as granules having an average size of about 30 microns. Commercial processing of the native starch during typical production of maltodextrin powder may provide maltodextrin products having no intact starch granules and having an average particle size after spray drying of about 75 microns to about 200 microns. One example of such a commercially available maltodextrin product is MALTRIN® M040, available from Grain Processing Corporation, Muscatine, Iowa, which is a dent corn based maltodextrin with a dextrose equivalent (DE) value of about 5.

It was also discovered that the starch-based clouding agents generally need to be retrograded to function as a clouding agent substantially free of titanium dioxide in powdered mix compositions. A retrograded maltodextrin suitable for such a clouding agents may be formed by dissolving a commercially available powdered maltodextrin of the specifically called for starch type and DE ranges described herein in an aqueous solution and storing that solution until maltodextrin particles of desired size and opacity of the solution are obtained. As used herein, the term "retrograded maltodextrin" refers to a maltodextrin that has been dissolved and stored in the dissolved form for a period of time sufficient to provide a solution that is visibly more opaque than pure water.

Turning to the details of an exemplary process of preparation of a clouding agent according to one approach, a retrograded maltodextrin suitable for use as a powdered starch-based clouding agent substantially free of titanium dioxide for a dry beverage mix composition may be prepared as follows:

First, a maltodextrin powder may be added to water. The water may be deionized and it will be appreciated that suitable solvents other than water may be used for retrogradation of the maltodextrin. By way of example only, sugar solutions, salt solutions, fruit juices, vegetable juices, and the like may be used as suitable solvents.

A suitable maltodextrin powder may be a commercially available maltodextrin or specifically-prepared maltodextrin powder, having, in some approaches, the specified DE ranges described herein for the selected maltodextrin type. The maltodextrin powder may be selected from amylose containing starches such as dent corn based maltodextrins, starches that contain little to no amylose, such as waxy corn based maltodextrins, or any other suitable maltodextrins obtainable from starch sources other than corn (e.g., potato, rice, or the like) so long as they form a desired clouding agent. Dent corn based maltodextrins as well as other maltodextrins produced from amylose containing starches that may be used to form a powdered starch-based clouding agent substantially free of titanium dioxide may have a dextrose equivalent of about 1 to about 15, in other approaches, about 5 to about 10, and in yet other approaches, about 1 to about 5. Waxy corn based maltodextrins as well as other maltodextrins produced from starches containing little to no amylose that may be used to form a powdered starch-based clouding agent substantially free of titanium dioxide may have a dextrose equivalent of about 1 to about 5, in other approaches, of about 1 to about 2. Some suitable dent corn based maltodextrins include, for example, MALTRIN® M040 (DE 5), available from Grain Processing Corporation, Muscatine, Iowa, and STARDRI® 100 (DE 10), available from Tate & Lyle, Hoffman Estates, Ill. Additionally, normal potato base maltodextrins such as Paselli SA2 are available from Avebe, Netherlands. Suitable waxy corn based maltodextrins include, for example, STARDRI® 1, available from Tate & Lyle, Hoffman Estates, Ill. In all cases, the starches still need to be retrograded per the processes herein before they will function as a suitable clouding agent.

By one approach, to form the retrograded starch suitable for a clouding agent, a maltodextrin product, for example, a powdered dent corn based maltodextrin or a powdered waxy corn based maltodextrin, may be added to water in amounts from about 2% by weight to about 40% by weight, in another approach, from about 20% by weight to about 40% by weight, and in another approach, from about 25% by weight to about 35% by weight. After the addition of the maltodextrin to the water, the water-maltodextrin mixture may be stirred until the powdered maltodextrin is dispersed in the water to form a solution. Depending on the source and the dextrose equivalent values of the maltodextrin used (e.g., dent corn maltodextrin, waxy corn maltodextrin, potato maltodextrin, or the like), the aqueous solution may have an increased absorbance relative to pure water. For example only, relative to deionized water with an absorbance value at 450 nm of about 0.0000, when dent corn based MALTRIN® M040 (DE 5) is added to deionized water at 30% w/w and agitated at ambient temperature, the aqueous solution with the dispersed MALTRIN® M040 may have absorbance values at 450 nm of about 0. 0.201±0.012. When dent corn based STAR-DRI® 100 (DE 10) is added to deionized water at 30% w/w, the aqueous solution including the dispersed STARDRI® 100 may have absorbance values at 450 nm of about 0.043±0.043. When waxy corn based STARDRI® 1 (DE 1) is added to deionized water at 30% w/w and dispersed, the aqueous solution including the dispersed STARDRI® 1 may have absorbance values at 450 nm of about 1.640±0.036.

In one approach, to fully dissolve the powdered maltodextrin in water, the aqueous solution with the dispersed maltodextrin may be heated at a temperature of about 100° F. to about 212° F. in one approach and from about 155° F. to about 175° F. in another approach for a period of time sufficient for absorbance to reach a desired value. In the known processes of maltodextrin production, after the desired DE value is reached in the initial maltodextrin production process, the resultant maltodextrin solution could then be stored for a predetermined period of time and retrograded. Advantageously, the methods described herein need not start with dried maltodextrins. The solution of water and maltodextrin after the heating may decrease in absorbance as compared to prior to the heating. Without wishing to be limited to theory, this reduction of the absorbance of the solution as a result of the heating is due to full dissolution of the dried maltodextrin polymers and their diminished ability to absorb light as evidenced by their reduction in absorbance values For example, after the aqueous solution including the dissolved dent corn based MALTRIN® M040 (DE 5) at 30% w/w is heated, the solution may have absorbance values at 450 nm of about 0.118±0.004 immediately after heating. After the aqueous solution including the dissolved dent corn based STARDRI® 100 (DE 10) at 30% w/w is heated, the solution may have absorbance values at 450 nm of about 0.032±0.022. After the aqueous solution including the waxy corn based STARDRI® 1 (DE 1) at 30% w/w is heated, the solution may have absorbance values at 450 nm of about 1.479±0.0742. As maltodextrins retrograde in aqueous solution, the individual molecules re-order into weak gels that further pack into semi-crystalline complexes. These complexes are thought to reflect visible light and appear white when in solution/suspension. Like most crystalline and semi-crystalline materials, these have defined melt/dissociation characteristics. Once these complexes are dissociated they may lose the ability to reflect visible light and no longer give opacity.

By one approach, after the aqueous solution including the dissolved maltodextrin is heated as described above, the aqueous solution may be stored for a predetermined period of time to achieve a desired level of retrogradation of the maltodextrin and in turn a desired opacity of the resulting aqueous solution. While the aqueous solution including the dissolved maltodextrin may be stored at ambient temperature (e.g., between about 65° F. to about 75° F.) or at refrigerated temperature (e.g., between about 35° F. to about 45° F.), it is believed that retrogradation of maltodextrin is facilitated by the cooler temperatures provided by refrigeration. In other words, the desired level of maltodextrin retrogradation may be achieved faster by storing the solution at refrigerated temperatures instead of ambient temperatures. By one approach, the aqueous solution including the dissolved maltodextrin is stored for at least about 12 hours and in other approaches, about 24 to about 48 hours. When retrograding solutions at ambient temperatures an antimicrobial strategy such as pH control or addition of antimicrobial ingredients is necessary.

Retrogradation in the aqueous solution may cause an increase in UV-Vis absorbance of the aqueous solution relative to the absorbance of the solution prior to and after the heating step. For example, dent corn based MALTRIN® M040 (DE 5) retrograded for about 24 hours in deionized water at 30% w/w at refrigeration temperatures of about 35° F. to about 45° F., preferably at 40° F., may have absorbance values at 450 nm of about 0.753±0.082 (absorbance values taken at 15% solids). Dent corn based MALTRIN® M040 (DE 5) retrograded for about 24 hours in deionized water at 30% w/w at ambient temperatures of about 65° F. to about 75° F. may have absorbance values at 450 nm of about 0.771±0.033 (absorbance values taken at 15% solids). Dent corn based STARDRI® 100 (DE 10) retrograded for about 24 hours in deionized water at 30% w/w at refrigerated temperatures of about 35° F. to about 45° F. may have absorbance values at 450 nm of about 0.670±0.079 (absorbance values taken at 15% solids). Waxy corn based STARDRI® 1 (DE 1) retrograded for about 24 hours in deionized water at 30% w/w at refrigerated temperatures of about 35° F. to about 45° F. may have absorbance values at 450 nm of about 1.887±0.067 (absorbance values taken at 15% solids).

It will be appreciated that the maltodextrin may be allowed to retrograde in water for periods of time less than 24 hours to provide a desired degree of maltodextrin retrogradation and opacity of the resulting aqueous solution and in turn a desired opacity-inducing potential of a resulting clouding agent. In one approach, a maltodextrin with a DE value of 10 at a concentration of 30% solids, may be retrograded for about 12-24 hours to achieve sufficient opacity for use as a clouding agent in dry beverage mixes (such as those for fruit juices). In another approach, a maltodextrin with a DE value of 5 at a concentration of 30% solids, may be retrograded for about 12-18 hours to achieve sufficient opacity for use as a clouding agent in dry beverage mixes (such as those for fruit juices).

Turning back to the exemplary method of preparing a powdered clouding agent for beverage mixes, after permitting the maltodextrin to retrograde in the aqueous solution for at least about 12 to about 24 hours at refrigerated or ambient temperatures, the aqueous solution may then be dried to form a retrograded maltodextrin powder. By one approach, spray-drying with an inlet temperature of about 160° F. to about 195° F. may be used. The dried retrograded maltodextrin powder was surprisingly found to provide an opacifying effect by itself and substantially without the use of any titanium dioxide when reconstituted with an aqueous solution. More specifically, the retrograded maltodextrin powder at the described DE ranges based on the type of starch was surprisingly found to provide a desired opacity level both when added to water alone and when added to water as part of a powdered beverage mix (e.g., lemonade beverage mix, juice beverage mix, or the like) without substantial levels of titanium dioxide. In some approaches, about 0.06 to about 0.1 percent of the starch-based clouding agent is added to the powdered beverage mix, as prepared.

It will be appreciated that while the clouding agent in the form of a powder formed from a retrograded maltodextrin may provide a desired opacity level even when used without any titanium dioxide, it will be appreciated that a clouding agent according to one embodiment may include small amounts of titanium dioxide. For example, the clouding agent may include titanium dioxide in amounts significantly lower than the amounts of titanium dioxide present in conventional clouding agents. By one approach, the clouding agent according to one embodiment may include from about 0.001% w/w titanium dioxide to about 0.005% w/w titanium dioxide. In such an embodiment, the opacity provided by the retrograded maltodextrin advantageously permits the amounts of titanium dioxide to be much lower than the amounts typically used in conventional clouding agents. In other approaches, substantially free of, free of, essentially free of and without substantial levels of an ingredients (such as titanium dioxide) means less than about 0.005%, in other approaches, less than about 0.001%, and in yet other approaches no amounts of such ingredient.

By one approach, a powdered clouding agent includes about 2% to about 6% moisture and may provide, upon reconstitution with water, an aqueous solution containing 0.02% starch based clouding agent having a light absorbance value at 450 nm of about 0.268±0.011. In one form, a powdered clouding agent as described herein may be incorporated into a concentrated powdered beverage mix (e.g., lemonade or fruit juice analog) prior to reconstitution in an amount of about 0.01% to about 3.0% and, in other approaches, about 0.1% of the clouding agent by total weight of the beverage mix to provide, upon reconstitution of about 7 to about 8 g of the powdered beverage mix with about 100 ml of water, a beverage having a light absorbance value at 450 nm of about 0.085 to about 1.457.

Settling rates and half-separation times indicate of the tendency of a clouding agent to precipitate out of the aqueous solution and sediment down, and may be used to determine the stability of the clouding agent after being reconstituted in water. After being reconstituted with water, the retrograded starch-based clouding agent may have faster settling rates than a conventional titanium dioxide clouding agent provided at the same amount by weight. For example, the retrograded starch-based clouding agent may have a time to half separation of about 3 to about 4 (in some cases, about 3.5) hours in water and about 9 to about 12 (in some cases, about 10) hours in a 7% sucrose/fructose model beverage system designed to mimic a beverage reconstituted from a conventional lemonade or juice powdered mix. In comparison, the conventional titanium dioxide-based clouding agent may have a time to half separation of about 21 hours in water and about 35 hours in a 7% sucrose/fructose model beverage system. Increasing the concentration of the retrograded starch-based clouding agent may increase the half separation times. It will be appreciated that the drying conditions may affect the particle size of the starch-based cloud system which in turn may affect the time for half separation. Additionally, it will be appreciated that changes to the viscosity of the aqueous solution may also affect time for half separation.

Without wishing to be bound by theory, when the starch-based maltodextrin is heated and dissolved in water, the crystalline structure of amylose and amylopectin molecules in the starch-based maltodextrin is believed to be initially lost and the starch-based maltodextrin hydrates to form a solution having slightly more viscosity. Without wishing to be limited to theory, when this viscous solution is cooled for a period of time of about 24 hours or more, the linear molecules of amylose, and the linear parts of amylopectin molecules retrograde and rearrange themselves again to a more crystalline structure. This may provide for an increased viscosity and absorbance of the solution after storage for about 24 hours.

The present inventors found that retrograded starch-based maltodextrins from different sources provided different degrees of opacity even when they had the same dextrose equivalent value. For example, without wishing to be limited by theory, the difference in the results obtained from a dent corn based retrograded maltodextrin having a dextrose equivalent of 5 versus a waxy corn based retrograded maltodextrin having a dextrose equivalent of 5 is believed to be attributable to the difference in the amount of amylose (linear component) present in these starch-based maltodextrins. Specifically, the dent corn based maltodextrin generally has an amylose content of about 20% to about 30% (in some cases, about 26%) and amylopectin content of about 70% to about 80% (in some cases, about 74%), while the waxy corn based maltodextrin has an amylose content of about 0% to about 1% (in some cases, no amylose) and amylopectin content of about 99% to about 100% (in some cases, about 100%). As such, the dent corn based maltodextrin has significantly more linear units such as amylose and significantly less branched units such as amylopectin while the waxy corn based maltodextrin has significantly less linear units such as amylose and significantly more branched units such as amylopectin. As a result, the dent corn based maltodextrin has a significantly more linear structure than the waxy corn based maltodextrin, and the waxy corn based maltodextrin has a significantly more branched structure than the dent corn based maltodextrin. Without wishing to be limited by theory, this structural difference between dent corn and waxy corn is believed to account for the fact that the more linear dent corn based maltodextrin is more susceptible to retrogradation and more conducive for providing an opaque solution when reconstituted in a liquid than the more branched waxy corn based maltodextrin having an identical DE value.

Without wishing to be limited by theory, it is believed that the chain length of the starch-based maltodextrins accounts for the ability of the waxy corn based maltodextrins to provide visible opacity. In particular, upon retrogradation, the longer chain length of a waxy corn maltodextrin having a DE value of 5 or less is believed to permit this maltodextrin to form an opacity-providing structure, while waxy corn based maltodextrins having DE values of 10, 15, and 18 have shorter chain lengths than the waxy corn maltodextrin having a DE value of 1, and do not form a structural matrices sufficient to impart visible opacity to the aqueous solutions after 24 hours of storage. It may be possible, that retrogradation of the waxy corn maltodextrins having a DE values between 10 and 18 for more than 24 hours, for example, for 48 hours, 72 hours, or more, may provide a liquid solution with similar opacity to that provided by the waxy corn maltodextrin having a DE value of 1 after 24 hours of retrogradation. In addition, it may be possible that waxy corn based maltodextrins having chain lengths that are longer than the chain length of a waxy corn maltodextrin having a DE value of 5, for example, waxy corn based maltodextrins with a DE values of 4, 3, and/or 2, if available commercially, may provide a solution that is visibly opaque after retrogradation for about 24 hours, albeit less opaque than the solution formed by 24 hour retrogradation of the waxy corn maltodextrin having a DE value of 1.

For example, as shown in Table 1 discussed in more detail below, the longer chain lengths of dent corn based maltodextrins such as MALTRIN® M040 (DE 5) and STARDRI® 100 (DE 10) are believed to account for the resulting significantly higher visually observable opacity provided by these retrograded maltodextrin products, while the shorter chain lengths of dent corn based maltodextrins such as STARDRI® 150 (DE 15) and STARDRI® 180 (DE 18) are believed to account for the resulting lack of visible opacity (even when retrograded) provided by these products as compared to MALTRIN® M040 (DE 5) and STARDRI® 100 (DE 10). Again, it may be possible, that retrogradation of STARDRI® 150 and STARDRI® 180 for more than about 24 hours, for example, for 48 hours, 72 hours, or more, may provide a liquid solution with similar opacity to that provide by MALTRIN® M040 and STARDRI® 100 after about 24 hours of retrogradation.

The clouding agents provided by the retrograded maltodextrins as described above advantageously provide an opacity of and/or similar to a natural juice to a drinkable beverage when reconstituted in water alone or as part of a beverage mix when added in amounts of about 0.1% to about 1.0% percent in the powdered beverage mix, though this will depend on the amount of water required for reconstitution. In addition, the clouding agents formed from the retrograded maltodextrins as described above are advantageously free of titanium dioxide and may provide powdered beverage mixes that are more desirable for consumers that may otherwise avoid a beverage mix that includes titanium dioxide, which may be perceived by the consumer to be a "less natural" ingredient than maltodextrin.

As such, the retrograded starch-based maltodextrin powder having dextrose equivalent values as described herein surprisingly provides a clouding agent that advantageously achieves a desired opacity that mimics the opacity of natural beverages without the necessity to combine the retrograded maltodextrin powder with substantial amounts of titanium dioxide. As such, the present inventors discovered a starch-based agent that is surprisingly effective as a clouding agent for dry beverage mixes without the use of substantial amounts titanium dioxide, advantageously avoiding the use of substantial amounts titanium dioxide and making the beverage mixes more appealing to consumers that may avoid using beverage mix products containing titanium dioxide as a clouding agent due to a possible perception by the consumers that titanium dioxide may be a "less natural" ingredient than maltodextrin.

Advantages and embodiments of the powdered clouding agent consisting essentially of retrograded maltodextrin having specified DE ranges and being substantially free of titanium dioxide described herein are further illustrated by the following examples; however, the particular conditions, processing schemes, materials, and amounts thereof recited in these examples, as well as other conditions and details, should not be construed to unduly limit this method. All percentages, ratios, and parts are by weight unless otherwise indicated.

EXAMPLES

The absorbance values obtained in Examples 1-3 are shown below in Table 1. It will be appreciated that the opacity values shown in Table 1 below are Log scale numbers and provide for higher differences in visually observable clouding effect than may appear based on the raw number values.

TABLE 1

Absorbance Values of Solutions Including Maltodextrins Retrograded for 24 Hours at Refrigerated Temperatures

| Maltodextrin Source | Inventive or Comparative | Absorbance at 450 nm after dissolution prior to heating (30% w/w) | Absorbance at 450 nm immediately post-heating (30% w/w) | Absorbance at 450 nm after 24 hrs of refrigerated storage (retrograded at 30% w/w, analyzed at 15% w/w) |
|---|---|---|---|---|
| STARDRI ® 1 (refrigerated) | Inventive | 1.640 ± 0.036 | 1.479 ± 0.074 | 1.887 ± 0.066 |
| STARDRI ® 5 (refrigerated) | Comparative | 0.048 ± 0.014 | 0.048 ± 0.032 | 0.109 ± 0.005 |
| STARDRI ® 15 (refrigerated) | Comparative | 0.016 ± 0.004 | 0.030 ± 0.031 | 0.109 ± 0.002 |
| STARDRI ® 18 (refrigerated) | Comparative | 0.037 ± 06 | 0.025 ± 0.018 | 0.100 ± 0.007 |
| STARDRI ® 100 (refrigerated) | Inventive | 0.043 ± 0.033 | 0.032 ± 0.022 | 0.6600 ± 0.079 |
| STARDRI ® 150 (refrigerated) | Comparative | 0.058 ± 0.008 | 0.030 ± 0.017 | 0.104 ± 0.007 |
| STARDRI ® 180 (refrigerated) | Comparative | 0.044 ± 0.015 | 0.017 ± 0.007 | 0.097 ± 0.007 |
| MALTRINS ® M040 (refrigerated) | Inventive | 0.201 ± 0.013 | 0.118 ± 0.004 | 0.753 ± 0.082 |
| MALTRINS ® M040 (ambient) | Inventive | 0.201 ± 0.013 | 0.118 ± 0.004 | 0.771 ± 0.033 |
| PASELLI ® SA2 (refrigerated) | Inventive | 1.371 ± 0.091 | 2.006 ± 0.250 | 1.857 ± 0.203 |

Example 1

Dent corn based MALTRIN® M040 with a dextrose equivalent (DE) of 5 was dispersed in water at 30% w/w with stirring to form a solution that was observed to be clear and non-viscous with a light absorbance value at 450 nm of about 0.201±0.013. The solution was then heated at a temperature of about 160° F. for about 10 min. The resulting solution was observed to be clear and non-viscous and had a light absorbance value at 450 nm of about 0.118±0.004. Aliquots of this solution were removed and placed into sealed 50 ml vials and stored at about 40° F. for about 24 hours.

Examination after 24 hours revealed that the retrograded MALTRIN® M040 provided a viscous, opaque, white liquid solution. This solution was then spray-dried with an atomizer at 1.0 amps and an inlet temperature of about 160° F., producing a white flowable powder. This powder was then rehydrated with tap water at a temperature of about 65° F. at 0.1% w/w and found to have retained its opacifying character with an absorbance value of about 0.268±0.011. Similarly, the powdered clouding agent, when incorporated into a model dry lemonade formula, yielded an opacity that is acceptable for a lemonade dry beverage mix product. The addition of color additives will impact absorbance values at 450 nm

|  | Without Yellow | With 0.008% Yellow dye |
|---|---|---|
| Without added cloud | 0.043 ± 0.001 | 0.089 ± .002 |
| With Maltodextrin-based cloud (spray dried retrograded Maltrin M040, 0.103%) | 0.116 ± 0.001 | 0.183 ± 0.002 |
| With Titanium dioxide based cloud 0.103% | 0.202 ± 0.001 | 0.422 ± 0.010 |

The retrograded MALTRIN® M040-based clouding agent provided at 0.1% w/w for a powdered lemonade mix, upon reconstitution with water, resulted in a drinkable lemonade beverage having an absorbance value at 450 nm of about 0.183±0.002. A conventional commercially available titanium dioxide-based clouding agent from Kronos, Inc. (Cranbury, N.J.) provided at 0.1% w/w for the same powdered lemonade mix, upon reconstitution with water, resulted in a drinkable lemonade beverage having an absorbance value at 450 nm of about 0.422±0.010. In a 0.02% solution in water, the conventional titanium dioxide based clouding agent had an average light absorbance at 450 nm of about 0.775±0.012 while the retrograded MALTRIN® M040-based clouding agent that has been spray dried had an average absorbance of 0.268±0.011. Increasing the concentration of retrograded MALTRIN® M040-based clouding agent to about 0.070% w/w was found to produce similar opacity value of 0.780±0.003 to the conventional commercially available titanium dioxide based sample noted above.

Example 2 (Comparative)

Waxy corn based STARDRI® 5 having a dextrose equivalent (DE) of 5 (obtained from Tate & Lyle, Hoffman Estates, Ill.) was dissolved in water at 30% w/w with stirring to form a solution that was observed to be clear and non-viscous with a light absorbance value at 450 nm of about 0.048±0.014. The solution was then heated at a temperature of about 160° F. for about 10 min. The resulting solution was observed to be clear and non-viscous and had a light absorbance value at 450 nm of about 0.048±0.032. Aliquots of this solution were removed and placed into sealed 50 ml vials and stored at 40° F. for about 24 hours.

Examination after 24 hours revealed that the retrograded STARDRI® 5 provided a slightly viscous but clear liquid solution. Retrograded solution had a resulting absorbance at 15% w/w of about 0.109±0.005

Example 3

Clouding agents from various maltodextrins were prepared using the methodology identical to that described in Examples 1 and 2. In particular, the following commercially available maltodextrins were tested for their suitability in providing a clouding agent upon retrogradation in water at 30% w/w: STARDRI® 1, a waxy corn based maltodextrin with a DE value of 1 (obtained from Tate & Lyle, Hoffman Estates, Ill.); STARDRI® 15, a waxy corn based maltodextrin with a DE value of 15 (obtained from Tate & Lyle, Hoffman Estates, Ill.); STARDRI® 18, a waxy corn based maltodextrin with a DE value of 18 (obtained from Tate & Lyle, Hoffman Estates, Ill.); STARDRI® 100, a dent corn based maltodextrin with a DE value of 10 (obtained from Tate & Lyle, Hoffman Estates, Ill.); STARDRI® 150, a dent corn based maltodextrin with a DE value of 15 (obtained from Tate & Lyle, Hoffman Estates, Ill.); STARDRI® 180, a dent corn based maltodextrin with a DE value of 18 (obtained from Tate & Lyle, Hoffman Estates, Ill.); and PASELLI® SA2, a potato starch based maltodextrin with a DE value of 2 (obtained from Avebe, Veendam, Netherlands). After about 24 hours of storage, the light absorbance of each solution (further diluted to 15% w/w) was measured using a Perkin Elmer Lambda 45 spectrophotomer (Waltham, Mass.).

As can be seen in Table 1 above, STARDRI® 1 and PASELLI® SA2 provided the highest opacity values as compared to the other maltodextrins used. However, PASELLI® SA2 was completely solid after 24 hours of storage and not suitable for a clouding agent. For example, since it is not uncommon for powdered beverage mixes to be stored at refrigerated temperatures after reconstitution with water to form a drinkable beverage, PASELLI® SA2 at 30% w/w does not appear to be suitable as a source for making a clouding agent for powdered beverage mixes at least because PASELLI® SA2 was observed to settle out of solution very quickly. It will be appreciated that PASELLI® SA2 may be suitable as a clouding agent, if used at concentrations less than 30% w/w.

Notably, STARDRI® 1 (DE 1) was the only waxy corn based maltodextrin of those tested that provided visually observable opacity. Conversely, waxy corn based maltodextrins having a shorter linear chain structure than STARDRI® 1, specifically, STARDRI® 5 (DE 5), STARDRI® 15 (DE 15) and STARDRI® 18 (DE 18) appeared to be clear after 24 hours of storage.

As can be seen in Table 1 above, retrogradation of dent corn based maltodextrins such as MALTRIN® M040 (DE 5) provided visible opacity both at refrigerated temperatures and at ambient temperatures. The opacity of the sample stored at refrigeration and the sample stored at ambient temperature were similar, which is surprising, since cooler temperatures are believed to facilitate the retrogradation of maltodextrin Conversely, dent corn based maltodextrins such as STARDRI® 150 (DE 15) and STARDRI® 180 (DE 18) appeared to be clear after 24 hours of storage.

Example 4

It was found that retrogradation of both amylose containing and waxy maltodextrins was able to occur in the presence hydrophobic materials such as oil. Retrogradation and a resulting increase in opacity occurred when various oils including neobee, soybean, and flavor oils such as lemon oil were introduced to the system.

Example 5

It was found that addition of solutes to the solutions of both amylose containing maltodextrins and waxy maltodextrins did not impede retrogradation. Retrogradation in the presence of soluble sugars such as sucrose and citric acid was able to occur. It is expected that retrogradation could also occur in a dilute salt solution.

Example 6

It was found that loss of opacity occurred in a solution with dried, retrograded maltodextrin acting as the cloud agent with the addition of heat. For a 0.5% solution, at temperatures of 115° F., opacity begins to decrease visibly. At temperatures above 155° F., absorbance values at 450 nm dropped to 0.027±0.012, signifying very little remaining opacifying effect.

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A method of preparing a powdered clouding agent that is free of titanium dioxide for a dry beverage mix composition, the method comprising:
    adding about 25 to 35 wt % of an amylose maltodextrin having a dextrose equivalent (DE) of between about 1 and about 15 to water to form a first maltodextrin solution where the maltodextrin is dissolved in the water,
    the first maltodextrin solution consisting of the maltodextrin and the water;
    heating the first maltodextrin solution that consists of the maltodextrin and the water at a temperature from about 125° F. to about 175° F. to form a heated first solution that consists of the maltodextrin and the water and is visibly clear;
    after the heating step, storing the heated first solution that consists of the maltodextrin and the water for at least 12 hours to provide a second solution that is visibly opaque and consists of a retrograded maltodextrin and the water; and
    drying the second solution to form the powdered clouding agent.

2. The method of claim 1, wherein the adding of the amylose containing maltodextrin to the water comprises adding a waxy maltodextrin having a dextrose equivalent of between about 1 and about 4 to the water in an amount of about 25% by weight to about 35% by weight.

3. The method of claim 1, wherein the heating of the first solution further comprises stirring the first solution during the heating.

4. The method of claim 1, wherein the retrograded maltodextrin is a retrograded corn maltodextrin, and wherein the powdered clouding agent consists of the retrograded corn maltodextrin and is substantially free of gum.

5. The method of claim 1, wherein the retrograded maltodextrin is a retrograded waxy maltodextrin, and wherein the powdered clouding agent consists of the retrograded waxy maltodextrin.

6. The method of claim 1, wherein the storing comprises storing the heated first solution at a temperature of about 35° F. to about 45° F.

7. The method of claim 1, wherein the storing comprises storing the first solution at a temperature of about 65° F. to about 75° F.

8. The method of claim 1, wherein the drying further comprises spray-drying the second solution at a temperature of about 155° F. to about 175° F.

9. The method of claim 1, further comprising adding the powdered clouding agent to water in an amount of from about 0.005% to about 0.1% by total weight to provide an opaque aqueous solution.

10. The method of claim 1, further comprising adding the powdered clouding agent to a dry beverage mix composition in an amount of about 0.1% to about 4% by total weight of the dry beverage mix composition.

11. The method of claim 10, further comprising adding the dry beverage mix composition to water in an amount of about 0.005% to about 0.10% by total weight to form an opaque drinkable beverage.

\* \* \* \* \*